3,586,703
HEAT STABLE MALEIC ANHYDRIDE COMPOSITION

Feliciano Martinez, Elmhurst, N.Y., and Jack B. Feder, Dumont, N.J., assignors to Halcon International, Inc.
No Drawing. Continuation-in-part of application Ser. No. 788,021, Dec. 30, 1968. This application Mar. 18, 1969, Ser. No. 808,327
Int. Cl. C07c 57/14
U.S. Cl. 260—346.8                              7 Claims

ABSTRACT OF THE DISCLOSURE

This invention relates to a heat stable composition of maleic anhydride, wherein small amounts of materials, such as alkali and alkali sulfates and halides are added to commercial maleic anhydride in order to essentially retain its color both on standing and heating.

---

This application is a continuation-in-part of application Ser. No. 788,021, filed Dec. 30, 1968, now abandoned.

This invention relates to color stable maleic anhydride compositions. In particular this invention relates to color stable maleic anhydride compositions containing an alkali or alkali earth chloride, sulfate, bromide, hydrochloric acid, hydrobromic acid, barium nitrate or silver chloride or mixtures containing two or more of said compounds.

Maleic anhydride is produced commercially from several principal sources such as by the vapor phase oxidation of organic compounds such as benzene, naphthenes, butene-1 and the like. While maleic anhydride so prepared can be purified by techniques known to the art to provide essentially white maleic anhydride, it is known that upon prolonged standing this anhydride has a tendency to discolor. Further, the rate of discoloration is even more pronounced when the solid maleic anhydride is maintained in its molten form.

The darkening of maleic anhydride upon standing and/or heating presents problems in its commercial utilization where the color of maleic anhydride is important. Such is the case in the paint industry for example, wherein maleic anhydride is used in the preparation of some paints. Therefore, there is a need in the industry for maleic anhydride which does no discolor to any great extent and preferably remains white or essentially retains its color, both upon standing as well as upon heating.

It is, therefore, an object of this invention to provide a novel maleic anhydride composition, containing a stabilizer, which upon standing at room temperature or higher for a period of time does not discolor to the same extent as a similar maleic anhydride without a stabilizer. Still another object is to provide a maleic anhydride which is derived from benzene, naphthene or butene-1 and which is similarly essentially color stable at both normal and elevated temperatures. Other objects of this invention will become clear upon reading the specification.

It was unexpectedly found that the objects of this invention are accomplished by incorporating into the maleic anhydride small amounts of a stabilizer such as hydrochloric acid, hydrobromic acid (both anhydrous and aqueous) silver chloride, barium nitrate, alkali or alkali earth sulfates, chlorides or bromides. The surprising ability of these compounds to act as stabilizer for this invention is clearly demonstrated when one considers that such compounds as sodium nitrate, sodium iodide, calcium nitrate, silver nitrate and silver sulfate are not useful as stabilizers for this invention, and in fact, discolor the maleic anhydride (MAN) to a greater extent, than if these materials were not present.

The amount of stabilizer used will depend to some extent upon whether the anhydride is to remain in the solid state or the molten state as well as the length of time and temperature involved. Generally, the amount of stabilizer needed to color stabilize solid maleic anhydride is less than that needed to color stabilize maleic anhydride which is to be maintained at elevated temperature (i.e., molten). Accordingly, the amount of stabilizer incorporated in the anhydride is from 0.01 p.p.m. by weight of maleic anhydride to 100,000 p.p.m. However, amounts of 0.1 to 100 p.p.m. are desired and amounts of 15 to 50 p.p.m. are preferred.

The source of crude or commercial maleic anhydride which is used to prepare the composition of this invention has little or no effect upon the ability of the composition to essentially retain its color. Therefore, this invention is applicable to the use of maleic anhydride when prepared by any of the commercially available methods. However, the invention is particularly applicable wherein the maleic anhydride has been prepared by the vapor phase oxidation of benzene or from butene. For example, the maleic anhydride employed in this invention may be readily prepared from the procedures as described in U.S. Pats. 2,967,185 and 2,777,860.

In accordance with this invention, the stabilizer is added to the distilled or normally commercially available maleic anhydride. In the preferred embodiment of this invention, the stabilizer is added to purified or commercial maleic anhydride which has been obtained from the vapor phase oxidation of benzene or butene. The preferred stabilizers of this invention are calcium chloride, barium chloride, barium nitrate and sodium chloride, and hydrochloric acid. (For purposes of this application, hydrochloric acid includes, anhydrous hydrogen chloride as well.)

The addition of the stabilizer to the maleic anhydride may be accomplished by any well-known means for the addition of a small amount of material to another. For example with hydrochloric acid or hydrobromic acid, the stabilizer may be added to a portion of the maleic anhydride so as to prepare a stock solution which may then be appropriately added to the bulk of the maleic anhydride; preferably however, the stabilizer is added directly to the bulk MAN. The temperature of the maleic anhydride to which the solid stabilizer is added or the temperature of the bulk maleic anhydride to which the stock solution is added, is not critical and may suitably be any desired temperature from the melting point of the maleic anhydride.

In the preferred embodiment the stabilizer is added to the bulk maleic anhydride maintained molten at any desired temperature of from 52° C. to 198° C., and preferably 55° C. to 80° C. The stabilizer, if added to maleic anhydride to prepare a stock solution, may be added in any concentration as an aqueous solution, as a solid or, in the case of hydrochloric acid and hydrobromic acid as the anhydrous acid. It is preferred, in the case of hydrochloric acid to add the acid as a concentrated aqueous solution such as 37% HCl. The final concentration of the stabilizer in the stock solution is not critical and may be as little as 50 p.p.m. or more; all that is required is that the concentration be sufficient so that upon addition to the total untreated maleic anhydride the final concentration of the composition is within the limits hereinabove described. The addition of the stabilizer to maleic anhydride to make up the stock solution addition of the latter to the untreated maleic anhydride or the direct addition of the stabilizer to the bulk maleic anhydride, may be readily carried out by stirring the molten maleic anhydride while adding the stabilizer or stock solution.

The composition prepared in accordance with this invention is considerably more color stable than maleic anhydride which has not been treated with the stabilizer. For example, when the composition of this invention is maintained at a temperature of 137–143° C. for 24 hours, its color is considerably lighter than a similar untreated maleic anhydride which has also been so heated. It has been found in some cases that when an untreated maleic anhydride is heated as described above it has a platinum-cobalt color of between 100 and 170 or more as measured by the well known ASTM method, whereas when the similar, but treated maleic anhydride has been heat treated as above a platinum-cobalt color of less than 80 is obtained. It has been specifically found that the composition of this invention, after heat treatment, has a platinum-cobalt color much less than the same maleic anhydride which has not been treated, but which has been subjected to the same heat treatment. In the preferred embodiment of my invention, the color stable composition has a platinum-cobalt color of less than 80 after being subjected to the heat treatment as described above.

The following examples are given by way of illustration:

EXAMPLE 1

(A)

200 grams of commercial maleic anhydride briquettes (produced by a commercial manufacturer designated manufacturer A) is melted at about 70° C. and to it is added, with stirring 2.4 grams of 37% HCl. This provides sufficient HCl to give a concentration of 4,400 p.p.m. in the maleic anhydride (so called stock solution). An additional quantity of maleic anhydride briquettes from the same source is then melted at 70° C. and to 100 grams of this material is added, with stirring, 1 gram of the maleic anhydride stock solution. We have thus prepared a mixture containing 43 p.p.m. of HCl. 50 ml. of this latter mixture is charged to a 50 ml. long-form Kimble glass Nessler tube which had previously been thoroughly washed, rinsed and dried in an oven maintained at about 120° C. The charged tube is placed in a heat block maintained at 140° C. and kept there for 24 hours. The heat block used conforms to that specified for ASTM method. After the 24 hours have elapsed the tube is removed from the heat block and compared with standard solutions which have been prepared according to the Platinum Cobalt color scale. This treated maleic anhydride is found to have a color of 80.

(B)

Another portion of the maleic anhydride briquettes is melted at 70° C. and thereafter charged with no further treatment to a Nessler tube which had been cleaned and dried by the same procedure as is used for the Nessler tube of Part A above. The charged Nessler tube is subjected to the same heat treatment as is used above, namely 140° C. for 24 hours. The platinum cobalt color of the maleic anhydride subsequent to this heat test is found to be 110.

EXAMPLE 2

(A)

An experiment similar to that described in Example 1A is performed excepting that in place of manufacturer A briquettes, briquettes obtained from another manufacturer, designated manufacturer B, are substituted. The heat stability color obtained after following the procedure of Example 1 is 50.

(B)

The experiment described in Example 1B is repeated excepting the briquettes of manufacturer B are substituted for the briquettes of manufacturer A. A heat stability color of 200 is obtained.

EXAMPLE 3

(A)

The experiment of Example 1A is repeated excepting that commercial maleic anhydride obtained from manufacturer C is substituted for the maleic anhydride obtained from manufacturer A. After the treatments described in Example 1A the color heat stability test is found to be 70.

(B)

The procedure of Example 1B is applied to commercial manufacturer C maleic anhydride in place of manufacturer A maleic anhydride. Heat stability color is found to be 170.

EXAMPLE 4

Example 2A is repeated, excepting that 22 p.p.m. of HCl is in the maleic anhydride subjected to the heat test rather than 43 p.p.m. (by using 0.5 gram rather than 1 gram of the 4,400 p.p.m. HCl mixture into 100 grams of maleic anhydride). Heat stability color is found to be 50.

When 0.25, 1.5 or 2.0 grams of the HCl mixture is used in place of 1.0 gram of the HCl mixture used in Example 2A, similar results are obtained.

When HBr is used in place of HCl in Example 2A, similar results are obtained.

The following table further illustrates our invention. Column 1 indicates the type of stabilizer employed and column 2 the p.p.m. of stabilizer. The stabilizer is added to the MAN in the following manner. A portion of the indicated maleic anhydride is heated to its molten state and to this is added with stirring sufficient stabilizer to make up the desired p.p.m. of stabilizer in the MAN. Column 3 illustrates the ASTM color of the composition immediately following the addition of the stabilizer or after the addition of the stabilizer and standing at room temperature for a period of time as indicated in column 5. Column 4 illustrates the ASTM color after a heat treatment given immediately after obtaining the data of column 3. (The heat treatment is carried out by maintaining the sample at 140° C.±3° C. for 24 hours.) Column 5 illustrates the length of time that the composition is maintained at room temperature before applying the heat treatment.

In each of columns 3 and 4, at least duplicate runs were made as shown. Testing and storage of the standard and the MAN composition is carried out in glass tubes.

Manufacturer B Briquettes

| Run | Stabilizer | P.p.m. | Initial color | Final color | Storage time, in hours |
|---|---|---|---|---|---|
| 1 | | | 30, 30 | 125, 125 | |
| 2 | HCl:H₂O | 44:76 | 20, 20, 20, 20 | 50, 50, 50, 50 | |
| 3 | Same as above | 44:76 | 30, 30 | 60, 60 | 72 |
| 4 | do | 44:76 | 20, 20 | 70, 70 | 144 |
| 5 | do | 44:76 | 15, 15 | 70, 75 | 240 |
| 6 | do | 44:76 | 30, 30 | 60, 70 | 398 |
| 7 | do | 22:38 | 20, 20 | 45, 45 | |
| 8 | do | 11:19 | 15, 15 | 50, 50 | |
| 9 | NaCl | 50 | 5, 5 | 60, 70 | |
| 10 | NaBr | 50 | 20, 20 | 60, 60 | |
| 11 | KCl | 50 | 15, 15 | 100, 100 | |
| 12 | K₂SO₄ | 50 | 25, 25 | 50, 50 | |
| 13 | Na₂SO₄/HCl/H₂O | 60:44:76 | 10, 10 | 90, 90 | |
| 14 | Na₂SO₄ | 60 | 10, 10 | 110, 110 | |
| 15 | CaCl₂ | 50 | 20, 20 | 60, 60 | |
| 16 | BaCl₂·2H₂O | 50 | 10, 10 | 70, 70 | |
| 17 | Ba(NO₃)₂ | 50 | 20, 20 | 70, 70 | |
| 18 | MgSO₄ | 50 | 15, 15 | 90, 90 | |
| 19 | MgCl₂·6H₂O | 50 | 5, 5 | 80, 80 | |
| 20 | Mg(NO₃)₂·6H₂O | 50 | 5, 5 | 80, 80 | |
| 21 | | | 50, 50, 15, 15 | 150, 150, 100, 100 | |
| 22 | HCl:H₂O | 44:76 | 30, 30, 30, 30 | 80, 80, 70, 70 | |
| 23 | HCl:H₂O | 22:38 | 25, 25 | 100, 100 | |

Manufacturer G Briquettes

| 24 | | | | 60 | |
| 25 | HCl:H₂O | 45:75 | 20, 20 | 60, 60 | |
| 26 | HCl:H₂O | 22:38 | 20, 20 | 50, 50 | |
| 27 | HBr:H₂O | 48:52 | 175, 175 | 300, 300 | |
| 28 | HBr:H₂O | 7:8 | 20, 20 | 60, 60 | |

Manufacturer D Briquettes

| 29 | | | 15, 15, 15, 15 | 500, 500, 500 400, 20, 40 | |
| 30 | BaCl₂·2H₂O | 50 | 15, 15 | 20, 40 | |

Manufacturer E Briquettes

| 31 | | | 15, 15, 15, 15 | 500, 300, 500 125 | |
| 32 | HCl:H₂O | 44:76 | 20, 15 | 50, 50 | |
| 33 | BaCl₂·2H₂O | 50 | 20, 15 | 60, 60 | |

Manufacturer F Briquettes

| 34 | | | 15, 15 | 500, 500 | |
| 35 | HCl:H₂O | 44:76 | 15, 15 | 90, 60 | |
| 36 | BaCl₂·2H₂O | 50 | 20, 25, 15, 15 | 40, 70, 35, 35 | |

| BaCl₂·2H₂O used, p.p.m.[1] | Time agitated at 60° C., hrs. | APHA color Before heat test | After |
|---|---|---|---|
| 0 | 4 | 15 | 150 |
| | 4 | 15 | 150 |
| | 4 | 15 | 200 |
| | 4 | 15 | 150 |
| 1 | 4 | 15 | 80 |
| | 4 | 15 | 100 |
| 15 | 4 | 15 | 90 |
| | 4 | 15 | 100 |
| 50 | 4 | 15 | 100 |
| | 4 | 15 | 100 |
| 10,000 | 4 | 15 | 80 |
| | 4 | 15 | 90 |

[1] Solids seen after treatment in all cases excepting zero use. Solids seen in Nessler tube after heat test likeness.

The above experiments clearly demonstrate the value of our stabilizers in maintaining the original color of the MAN or in reducing the amount of color change which would occur if the MAN were heat treated without a stabilizer of our invention.

What is claimed is:

1. A color stable composition consisting essentially of maleic anhydride and 0.01 to 100,000 p.p.m. by weight of maleic anhydride of stabilizer selected from the group consisting of at least one of sodium or potassium chloride, sodium and potassium bromide, sodium or potassium sulfate, calcium, barium or magnesium chloride, calcium, barium or magnesium bromide, calcium, barium or magnesium sulfate, barium nitrate, silver chloride, hydrobromic acid and hydrochloric acid.

2. A color stable composition of claim 1 wherein the stabilizer is calcium chloride, barium chloride or potassium chloride.

3. A color stable composition of claim 1 wherein the stabilizer is hydrochloric acid.

4. The method for improving the color stability of maleic anhydride which comprises incorporating into the said maleic anhydride 0.01 to 100,000 p.p.m. by weight maleic anhydride of sodium or potassium chloride, sodium or potassium bromide, sodium or potassium sulfate, calcium, barium or magnesium chloride, calcium, barium or magnesium bromide, calcium, barium or magnesium sulfate, barium nitrate, silver chloride, hydrobromic acid and hydrochloric acid.

5. The method of claim 4 wherein the stabilizer is calcium chloride, barium chloride or potassium chloride and the amount of stabilizer is from 0.1 to 100 p.p.m.

6. A color stable composition of claim 1 wherein the stabilizer is barium chloride.

7. The method of claim 4 wherein the stabilizer is barium chloride.

References Cited

UNITED STATES PATENTS 3,115,503  12/1963  Bowman.

ALEX MAZEL, Primary Examiner

B. I. DENTZ, Assistant Examiner

U.S. Cl. X.R.

252—397